US012202363B2

(12) United States Patent
Liu et al.

(10) Patent No.: US 12,202,363 B2
(45) Date of Patent: Jan. 21, 2025

(54) VEHICLE CHARGING PORT MOUNTING ASSEMBLY AND VEHICLE

(71) Applicant: NIO TECHNOLOGY (ANHUI) CO., LTD, Hefei (CN)

(72) Inventors: Yuxuan Liu, Shanghai (CN); Hongli Wang, Shanghai (CN); Ming Cheng, Shanghai (CN); Xiaohua Liu, Shanghai (CN); Wenhui Shi, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 429 days.

(21) Appl. No.: 17/708,144

(22) Filed: Mar. 30, 2022

(65) Prior Publication Data
US 2022/0314825 A1 Oct. 6, 2022

(30) Foreign Application Priority Data
Mar. 31, 2021 (CN) .......................... 202110351429.5

(51) Int. Cl.
*B60L 53/30* (2019.01)
*B60L 53/16* (2019.01)

(52) U.S. Cl.
CPC ............... *B60L 53/30* (2019.02); *B60L 53/16* (2019.02)

(58) Field of Classification Search
CPC ................................. B60L 53/30; B60L 53/16
USPC ........................................................ 320/109
See application file for complete search history.

(56) References Cited

U.S. PATENT DOCUMENTS

| | | | | |
|---|---|---|---|---|
| 5,413,493 A | * | 5/1995 | Hoffman ................. | B60L 53/65 |
| | | | | 200/51.09 |
| 5,637,977 A | * | 6/1997 | Saito .................... | H01R 13/629 |
| | | | | 320/109 |
| 5,850,135 A | * | 12/1998 | Kuki ..................... | B60L 53/665 |
| | | | | 320/108 |

(Continued)

*Primary Examiner* — Suresh Memula
(74) *Attorney, Agent, or Firm* — Sheridan Ross P.C.

(57) ABSTRACT

The invention relates to the technical field of vehicle charging, and particularly provides a vehicle charging port mounting assembly and a vehicle. The invention aims to solve the problem that existing charging port components have a poor design of mounting structure and thus cannot well meet the usage requirements. To this end, the vehicle charging port mounting assembly of the invention comprises a body side outer panel, a charging port component, a charging port mounting component, a rear wheel cover outer panel and a rear wheel cover outer panel reinforcing plate, wherein the charging port mounting component comprises a mounting bracket and an accommodation support member which is provided with an accommodation chamber, the mounting bracket being disposed in the accommodation chamber and fixedly connected to the accommodation support member, and the accommodation support member being disposed between the body side outer panel and the rear wheel cover outer panel. The charging port component is fixed by both the mounting bracket and the accommodation support member, thereby effectively improving the durability and NVH features of this region. The design requirement of dry-wet separation can also be effectively achieved by means of the accommodation support member, and the local strength of this region can be increased by means of the rear wheel cover outer panel reinforcing plate, thereby effectively meeting multiple requirements.

10 Claims, 5 Drawing Sheets

(56) References Cited

U.S. PATENT DOCUMENTS

| | | | |
|---|---|---|---|
| 2014/0111144 A1* | 4/2014 | Mo | B60L 53/16 320/107 |
| 2014/0167693 A1* | 6/2014 | Wood | B60L 50/52 320/109 |

* cited by examiner

VEHICLE CHARGING PORT MOUNTING ASSEMBLY AND VEHICLE

CROSS-REFERENCE TO RELATED APPLICATION

This application claims the benefit of China Patent Application No. 202110351429.5 filed Mar. 31, 2021, the entire contents of which are incorporated herein by reference in its entirety.

TECHNICAL FIELD

The invention relates to the technical field of vehicle charging, and particularly provides a vehicle charging port mounting assembly and a vehicle.

BACKGROUND ART

A charging port component is an indispensable element of electric vehicles and hybrid vehicles. The design of its mounting structure not only needs to meet assembly requirements, but also has many features such as attractive appearance, durability, and safety. An existing current charging port component is generally secured to a vehicle body by means of a mounting bracket. For the mounting bracket, as a full-life-cycle component, it is necessary to not only ensure that the mounting bracket will not be deformed or damaged due to repeated plugging and unplugging of the charging socket during daily charging, but also ensure that in the case of a malfunction of a charging connecting plug, no serious damage will occur even if various misoperations are carried out, thereby effectively preventing potential safety hazards. Therefore, the design strength and design stiffness of the mounting bracket must be high enough to meet the needs of use. However, the design of excessively high local strength is not conducive to the arrangement of a force transferring path on a wheel cover outer panel, and also likely leads to the problem of local stress concentration and thus causes the problem that the wheel cover outer panel is prone to deformation and the deformed wheel cover outer panel cannot fit well with a body side outer panel. In addition, it may also lead to the problem of local water leakage or possible abnormal noise when a vehicle is running. Thus, the actual design thereof is relatively more difficult.

In addition, according to the daily parking habits, the charging port component needs to be arranged on the rear side of the vehicle to meet the charging needs of the user after reversing the vehicle into a parking lot. However, it is also necessary to arrange essential parts, such as tires, at the rear of the vehicle, and the charging port component is located in a dry-wet separation region of the vehicle body and has a limited arrangement space. Accordingly, the existing charging port components are all directly designed in a wet zone or in a dry zone, thus greatly limiting the arrangement positions, style design, etc. of charging ports. Meanwhile, market demand is also a part of structural design input to achieve a platform-based design, and it is also difficult for existing charging port mounting brackets to consider the mounting requirements of a variety of vehicle models and different charging assemblies at home and abroad. Especially, it is also necessary to consider the convenience of charging operation from the perspective of users, fit the design of maximizing the opening angle of a charging port cover and the shallow socket design of a charging socket, and optimize the visibility and ease of operation of users during charging, and the mounting structure of the existing charging port components is difficult to simultaneously meet the multiple requirements.

Accordingly, there is a need in the field for a novel vehicle charging port mounting assembly and a vehicle to solve the above problems.

SUMMARY OF THE INVENTION

In order to solve the above problems in the prior art, that is, in order to solve the problem that the existing charging port components have a mounting structure that is not well designed to meet usage requirements, the invention provides a vehicle charging port mounting assembly. The vehicle charging port mounting assembly comprises a body side outer panel, a charging port component, a charging port mounting component, a rear wheel cover outer panel and a rear wheel cover outer panel reinforcing plate, wherein the rear wheel cover outer panel reinforcing plate is fixedly connected to an inner side of the rear wheel cover outer panel; the charging port mounting component comprises a mounting bracket and an accommodation support member which is provided with an accommodation chamber, the mounting bracket being disposed in the accommodation chamber and fixedly connected to the accommodation support member, and the accommodation support member being disposed between the body side outer panel and the rear wheel cover outer panel; the charging port component comprises a charging port cover assembly and a charging socket assembly, the charging port cover assembly being capable of covering the charging socket assembly; the body side outer panel is provided with a first mounting opening, the charging port cover assembly is disposed in the first mounting opening, and the shape of the first mounting opening matches the shape of an outer side portion of the charging port cover assembly, such that the outer side portion of the charging port cover assembly is capable of covering the first mounting opening and thus covering the charging socket assembly; and the accommodation support member is provided with a second mounting opening, the rear wheel cover outer panel is provided with a third mounting opening, the rear wheel cover outer panel reinforcing plate is provided with a fourth mounting opening, and the charging socket assembly is capable of successively passing through the fourth mounting opening, the third mounting opening and the second mounting opening and is then fixedly connected to the mounting bracket.

In a preferred technical solution of the vehicle charging port mounting assembly described above, the shape of an outer side edge of the accommodation support member matches the shape of a part of an inner side surface of the body side outer panel such that the accommodation support member is fitted and connected to the inner side surface of the body side outer panel.

In a preferred technical solution of the vehicle charging port mounting assembly described above, the accommodation support member is fitted and connected to the body side outer panel by means of vibration isolation adhesive.

In a preferred technical solution of the vehicle charging port mounting assembly described above, the mounting bracket comprises a mounting plate and mounting feet extending inwards along the mounting plate, and the mounting plate is provided with a through hole; and the charging socket assembly is fixedly connected to the mounting plate, a charging port of the charging socket assembly is disposed at the through hole, and the mounting bracket is fixedly connected to the accommodation support member by means of the mounting feet.

In a preferred technical solution of the vehicle charging port mounting assembly described above, the mounting feet are fixedly connected to the accommodation support member by means of welding.

In a preferred technical solution of the vehicle charging port mounting assembly described above, the accommodation support member is fixedly connected to the rear wheel cover outer panel by means of welding, and/or the rear wheel cover outer panel is fixedly connected to the rear wheel cover outer panel reinforcing plate by means of welding.

In a preferred technical solution of the vehicle charging port mounting assembly described above, the vehicle charging port mounting assembly further comprises a D-pillar reinforcing plate fixedly connected to the rear wheel cover outer panel reinforcing plate.

In a preferred technical solution of the vehicle charging port mounting assembly described above, the shape of part of edge of the body side outer panel matches the shape of part of edge of the D-pillar reinforcing plate, such that the body side outer panel is connected to the D-pillar reinforcing plate by means of edge covering and bonding; and/or the shape of part of edge of the body side outer panel matches the shape of part of edge of the rear wheel cover outer panel, such that the body side outer panel is connected to the rear wheel cover outer panel by means of edge covering and bonding.

In a preferred technical solution of the vehicle charging port mounting assembly described above, the accommodation support member is provided with a first water discharge hole, the rear wheel cover outer panel is correspondingly provided with a second water discharge hole, and the first water discharge hole is connected to the second water discharge hole by means of a water discharge pipe such that water in the accommodation support member is discharged to the outside of a vehicle.

In addition, the invention further provides a vehicle including the vehicle charging port mounting assembly described in any one of the preferred technical solutions described above.

It can be understood by those skilled in the art that in a preferred technical solution of the invention, the vehicle charging port mounting assembly of the invention comprises a body side outer panel, a charging port component, a charging port mounting component, a rear wheel cover outer panel and a rear wheel cover outer panel reinforcing plate, wherein the rear wheel cover outer panel reinforcing plate is fixedly connected to an inner side of the rear wheel cover outer panel; the charging port mounting component comprises a mounting bracket and an accommodation support member which is provided with an accommodation chamber, the mounting bracket being disposed in the accommodation chamber and fixedly connected to the accommodation support member, and the accommodation support member being disposed between the body side outer panel and the rear wheel cover outer panel; the charging port component comprises a charging port cover assembly and a charging socket assembly, the charging port cover assembly being capable of covering the charging socket assembly; the body side outer panel is provided with a first mounting opening, the charging port cover assembly is disposed in the first mounting opening, and the shape of the first mounting opening matches the shape of an outer side portion of the charging port cover assembly, such that the outer side portion of the charging port cover assembly is capable of covering the first mounting opening and thus covering the charging socket assembly; and the accommodation support member is provided with a second mounting opening, the rear wheel cover outer panel is provided with a third mounting opening, the rear wheel cover outer panel reinforcing plate is provided with a fourth mounting opening, and the charging socket assembly is capable of successively passing through the fourth mounting opening, the third mounting opening and the second mounting opening and is then fixedly connected to the mounting bracket.

According to the invention, the charging port component is fixed by the mounting bracket and the accommodation support member. By means of additionally providing the accommodation support member, the local strength of this region can be increased, and thus the stiffness of the body side outer panel in this region is increased, so as to effectively prevent the noise generation during running of the vehicle and the deformation of this region due to compression during maintenance of the vehicle. In addition, a passenger compartment and a charging region can be isolated so as to prevent water leakage. Moreover, owing to this design, the charging socket assembly is closer to the body side outer panel, so as to effectively meet a shallow socket design of a charging socket. This configuration method is not limited by shaping of the rear wheel cover outer panel and is beneficial to the design in a charging state, which greatly reduces the affection of the style of the charging socket assembly to the rear wheel cover outer panel during structural development so as to effectively shorten the development cycle of the rear wheel cover outer panel, and is also more advantageous to the platform design.

In addition, according to the invention, by means of additionally providing the accommodation support member, the design requirement of dry-wet separation can also be effectively achieved, such that the space between the body side outer panel and the accommodation support member is changed from a dry zone to a wet zone, thereby achieving an arrangement path of the charging socket assembly from the wet zone to the dry zone and then to the wet zone. Also, since the mounting region where the charging port cover assembly is located is always in the wet zone, the sealing between the charging port cover assembly and the body side outer panel and the sealing between the charging port cover assembly and the charging socket assembly are effectively omitted, thus effectively saving on the arrangement space and sealing costs.

Furthermore, according to the invention, by means of additionally providing the rear wheel cover outer panel reinforcing plate and connecting the rear wheel cover outer panel reinforcing plate to the D-pillar reinforcing plate, the connection to the force transferring path in the vehicle body can also be achieved while increasing local strength and local stiffness, which effectively avoids the affection of the charging socket assembly to the mode of the rear wheel cover outer panel so as to effectively improve the durability and NVH features of this region and then assist in improving the bending and torsion performance of the entire vehicle, and meets the requirement of durability of the charging socket assembly for repeated plugging and unplugging with the lowest costs and the lightest weight so as to ensure the reliability of charging performance.

Further, according to the invention, by means of providing the third mounting opening in the rear wheel cover outer panel, the charging socket assembly, when being assembled, can first enter the mounting region from below the rear wheel cover outer panel and be pre-hung on the mounting bracket during component so as to effectively improve the mounting efficiency of the charging socket assembly, and a fixing bolt is then screwed via the first mounting opening in the body side outer panel so as to achieve design of the charging port cover assembly with reduced size to better optimize the overall layout of the vehicle. Meanwhile, when the charging socket assembly needs maintenance, it is also possible to assemble and disassemble the charging socket assembly from below the rear wheel cover outer panel without disassembly of the charging port cover assembly, thereby effectively simplifying a maintenance operation, improving the maintenance efficiency, and reducing the maintenance costs.

Still further, according to the invention, the shape of the outer side edge of the accommodation support member is configured to match the shape of a part of the inner side surface of the body side outer panel, the accommodation support member can be fitted and connected to the inner side surface of the body side outer panel, thereby achieving a better connection effect. In addition, the accommodation support member is connected to the body side outer panel by means of fitting with the vibration isolation adhesive, with a certain gap being reserved during connection, and the gap is filled due to the expansion of the vibration isolation adhesive during coating and baking, which decreases the vehicle body tolerance and can also provide a strong support for the body side outer panel, thereby effectively improving the strength and stiffness of the body side outer panel in this region so as to effectively reduce the structural noise as well as the deformation of this region due to compression during the maintenance operation of the vehicle.

Figure 1:
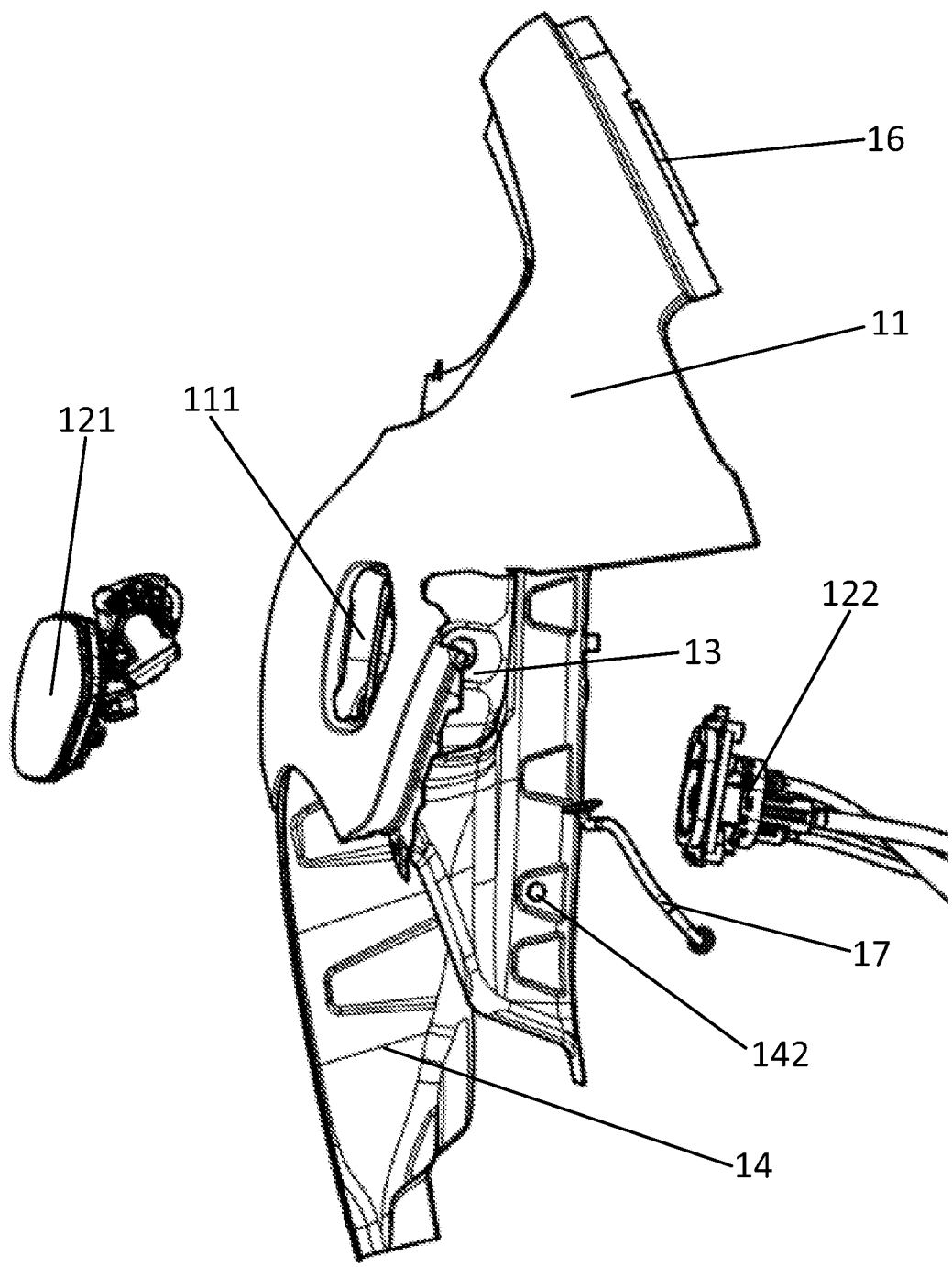
FIG. 1 is a schematic diagram of an overall structure of a vehicle charging port mounting assembly of the invention.

REFERENCE NUMERALS 11. body side outer panel; 111. first mounting opening;
121. Charging port cover assembly; 122. Charging socket assembly;
13. charging port mounting component; 131. mounting bracket; 1311. mounting plate; 1312. mounting foot; 1313. through hole; 132. accommodation support member; 1321. second mounting opening; 1322. first water discharge hole; 1323. wiring harness hole;
14. rear wheel cover outer panel; 141. third mounting opening; 142. second water discharge hole;
15. rear wheel cover outer panel reinforcing plate; 151. fourth mounting opening;
16. D-pillar reinforcing plate; and
17. water discharge pipe.

DETAILED DESCRIPTION OF EMBODIMENTS

Preferred embodiments of the invention are described below with reference to the drawings. It should be understood by those skilled in the art that these embodiments are only for explaining the technical principles of the invention and are not intended to limit the scope of protection of the invention. Those skilled in the art can make adjustments according to requirements so as to adapt to specific application scenarios. For example, although the preferred embodiments are described in conjunction with the case where the vehicle is an electric vehicle, it is obvious that the vehicle described in the invention may also be a hybrid electric vehicle. Such a change of the specific type of vehicles does not depart from the basic principle of the invention, and falls within the scope of protection of the invention.

It should be noted that in the description of the invention, the terms, such as "upper", "lower", "left", "right", "inner" and "outer", that indicate directions or positional relationships are based on the directions or positional relationships shown in the drawings only for convenience of description, and do not indicate or imply that the device or element must have a specific orientation, be constructed and operate in a specific orientation, and therefore cannot be understood as limitation to the invention. In addition, the terms "first", "second", "third" and "fourth" are for descriptive purposes only and should not be construed as indicating or implying relative importance.

In addition, it should also be noted that, in the description of the invention, the terms "mount", "engage" and "connect" should be interpreted in a broad sense unless explicitly defined and limited otherwise, which, for example, may mean a fixed connection, a detachable connection or an integral connection; may mean a mechanical connection or an electrical connection; and may mean a direct connection, an indirect connection by means of an intermediary, or internal communication between two elements. For those skilled in the art, the specific meaning of the above-mentioned terms in the invention can be interpreted according to the specific situation.

Figure 2:
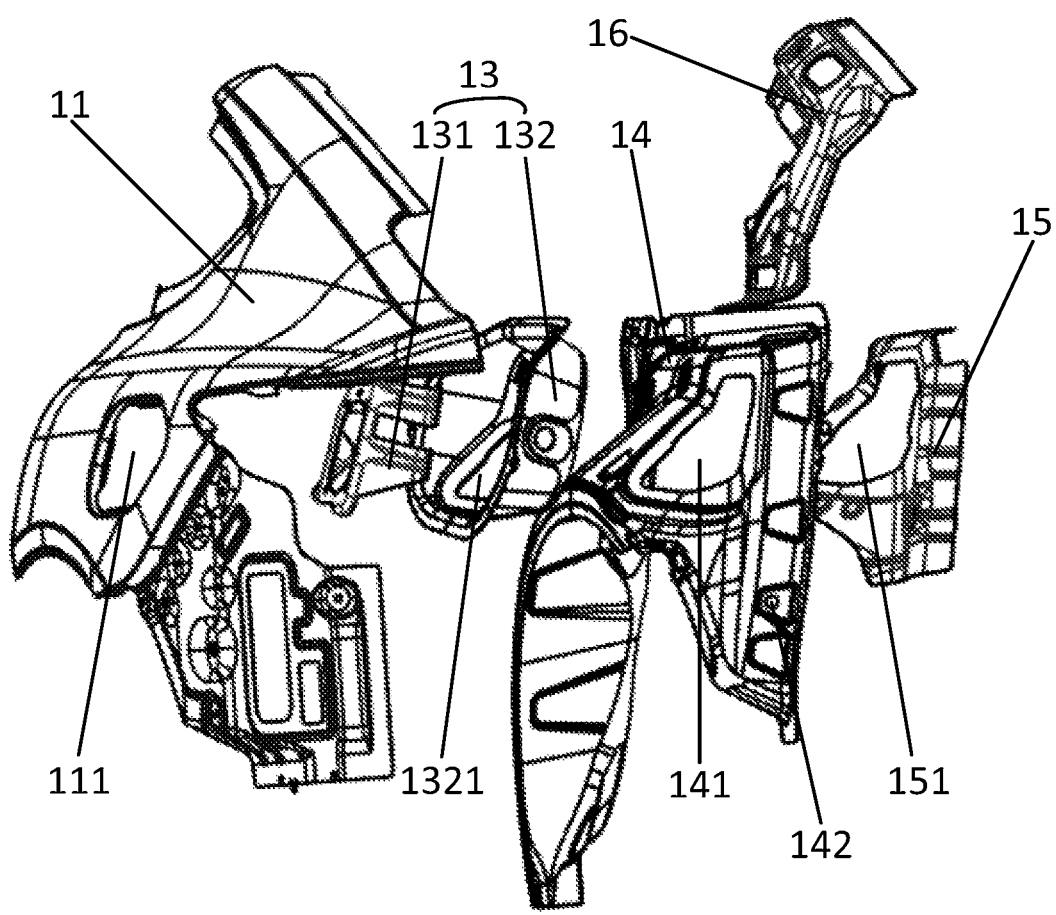
FIG. 2 is an exploded view of the vehicle charging port mounting assembly of the invention.
Figure 3:
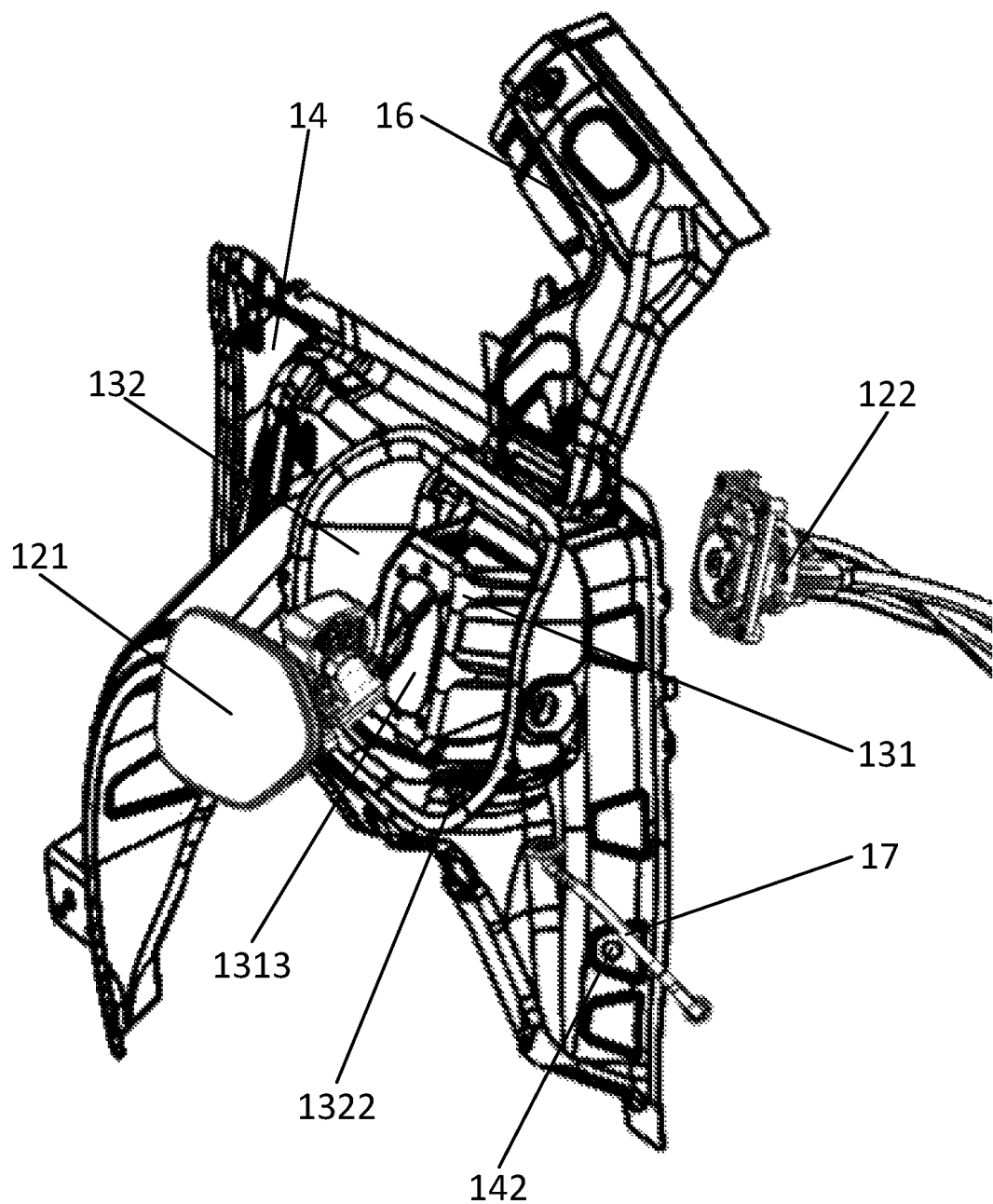
FIG. 3 is a schematic structural diagram of the vehicle charging port mounting assembly of the invention without a body side outer panel.

First, reference is made to FIGS. 1 to 3. FIG. 1 is a schematic diagram of an overall structure of a vehicle charging port mounting assembly of the invention. FIG. 2 is an exploded view of the vehicle charging port mounting assembly of the invention; FIG. 3 is a schematic structural diagram of the vehicle charging port mounting assembly without a body side outer panel of the invention. As shown in FIGS. 1 to 3, the vehicle charging port mounting assembly of the invention comprises a body side outer panel 11, a charging port component, a charging port mounting component 13, a rear wheel cover outer panel 14 and a rear wheel cover outer panel reinforcing plate 15, wherein the rear wheel cover outer panel reinforcing plate 15 is fixedly connected to an inner side of the rear wheel cover outer panel 14 (that is, an inner side relative to a vehicle). The vehicle of the invention is charged by means of the charging port component to supplement its own power. Of course, the invention imposes no limitation on the specific structure and the specific type of the charging port component, and the technical personnel can configure same themselves according to actual usage requirements. In addition, it should also be noted that the invention imposes no limitation on the specific structures and shapes of the body side outer panel 11 and the rear wheel cover outer panel 14, and the technical personnel can configure same themselves according to actual usage requirements. The charging port mounting component 13 comprises a mounting bracket 131 and an accommodation support member 132 which is provided with an accommodation chamber, the mounting bracket 131 being disposed in the accommodation chamber and fixedly connected to the accommodation support member 132, and the accommodation support member 132 being disposed between the body side outer panel 11 and the rear wheel cover outer panel 14. Furthermore, it should also be noted that the invention imposes no limitation on the specific structures and shapes of the mounting bracket 131 and the accommodation support member 132 as long as the configuration requirements described above can be met.

Further, the charging port component comprises a charging port cover assembly 121 and a charging socket assembly 122, wherein when the charging port cover assembly 121 is in an open state, the charging socket assembly 122 is exposed to for a charging operation, and when the charging port cover assembly 121 is in a closed state, the charging socket assembly 122 is cover by the charging port cover assembly 121 for protection. It should be noted that the invention imposes no limitation on the opening mode and closing mode of the charging port cover assembly 121, and the technical personnel can configure same themselves according to actual usage requirements. Also, the invention imposes no limitation on the specific structure of the charging socket assembly 122 as long as a charging function can be achieved. The body side outer panel 11 is provided with a first mounting opening 111, the charging port cover assembly 121 is disposed in the first mounting opening 111, and the shape of the first mounting opening 111 matches the shape of an outer side portion (that is, an outer side relative to the vehicle) of the charging port cover assembly 121, such that the outer side portion of the charging port cover assembly 121 can cover the first mounting opening 111 and thus cover the charging socket assembly 122. In addition, the accommodation support member 132 is provided with a second mounting opening 1321, the rear wheel cover outer panel 14 is provided with a third mounting opening 141, the rear wheel cover outer panel reinforcing plate 15 is provided with a fourth mounting opening 151, and the charging socket assembly 122 can successively pass through the fourth mounting opening 151, the third mounting opening 141 and the second mounting opening 1321 from the inside to the outside and is then fixedly connected to the mounting bracket 131.

With continued reference to FIGS. 1 and 2, as shown in FIGS. 1 and 2, the outer side portion of the charging port cover assembly 121, that is, the left side portion shown in the figure, is in a pentagonal shape, the first mounting opening 111 provided in the body side outer panel 11 is also in the pentagonal shape, and the edge of the first mounting opening 111 extends inwards to meet the clamping requirement of the charging port cover assembly 121, so that the charging port cover assembly 121 can be filled into the first mounting opening 111 more stably, In addition, since the vehicle body design has achieved dry-wet separation, the clamping region does not need to ensure continuous flanging to ensure a waterproof effect. Therefore, process holes can be appropriately used to reduce the difficulty of stamping of the body side outer panel 11. Of course, the invention imposes no limitation on the specific arrangement position and the specific shape of the first mounting opening 111, as long as the charging port cover assembly 121 can be connected into the first mounting opening 111 and the effect of covering the charging socket assembly 122 can be achieved. Furthermore, it should also be noted that the invention imposes no limitation on a specific fixing manner of the charging port cover assembly 121, and the technical personnel can configure same themselves according to actual usage requirements. Preferably, the charging port cover assembly 121 is connected to the body side outer panel 11 in a clamping manner so as to effectively improve the assembly and disassembly efficiency.

Figure 4:
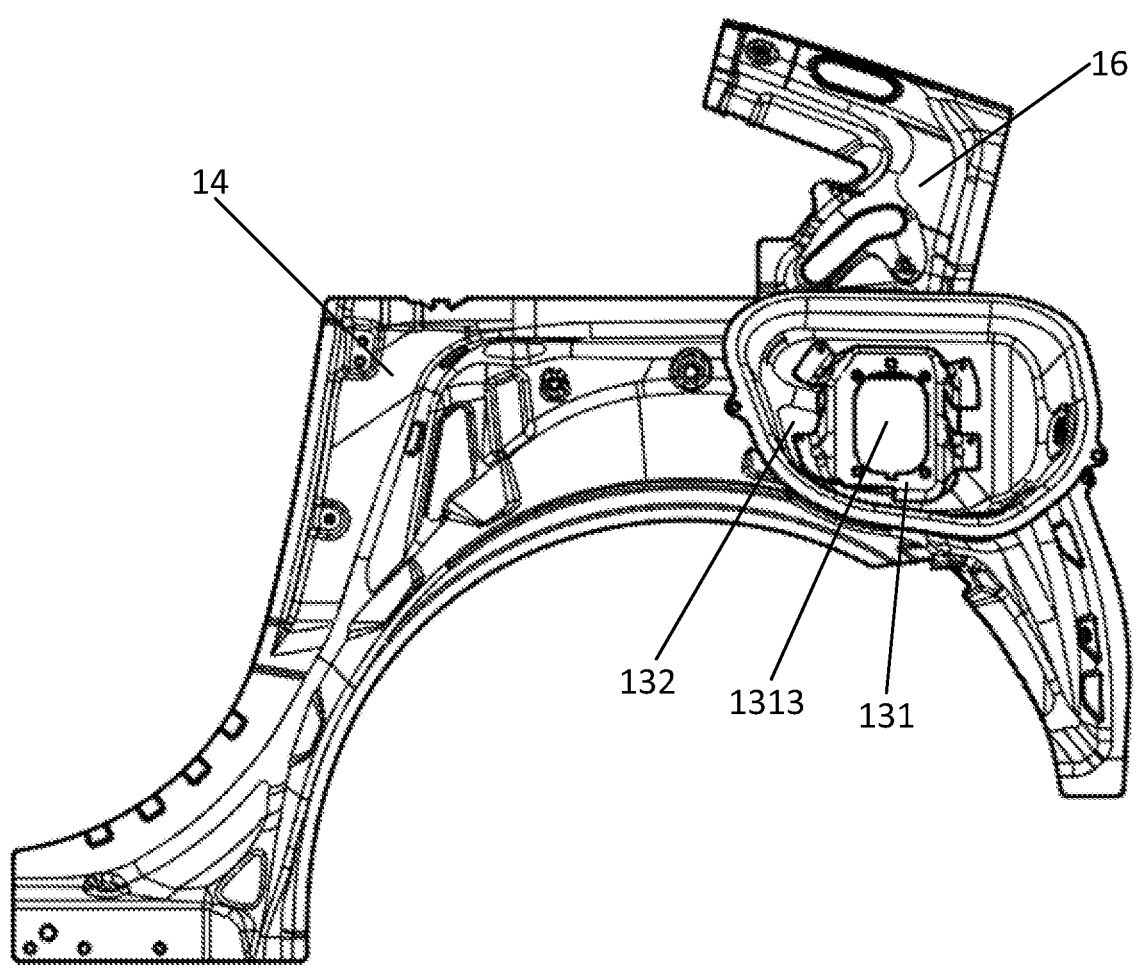
FIG. 4 is a schematic diagram of a partial structure of the vehicle charging port mounting assembly of the invention.
Figure 5:
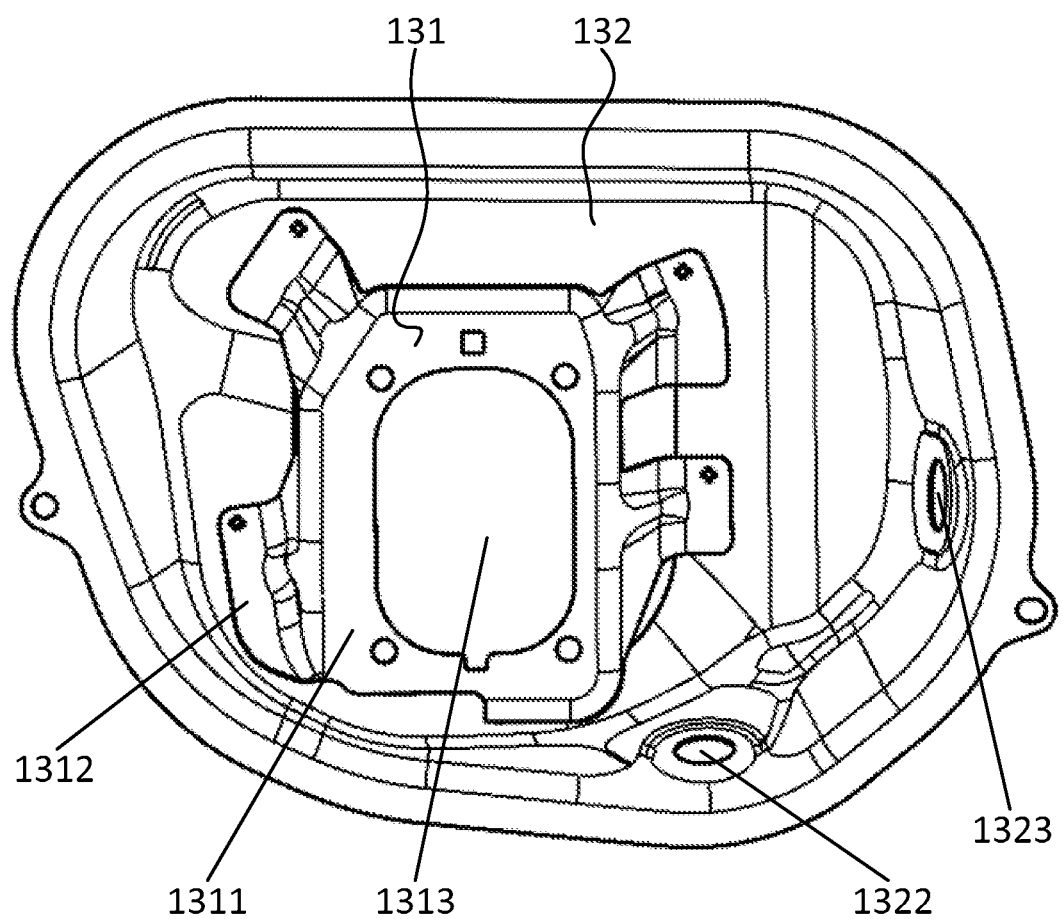
FIG. 5 is a schematic diagram of an overall structure of the charging port mounting component of the invention.

Further, reference is made to FIGS. 4 and 5. FIG. 4 is a partial schematic structural diagram of the vehicle charging port mounting assembly of the invention. FIG. 5 is a schematic diagram of an overall structure of the charging port mounting component of the invention. As shown in FIGS. 2 to 5, as a preferable configuration, a main body of the accommodation support member 132 is configured to be a square bowl-shaped structure, and a side surface of the square bowl-shaped structure is provided with a wiring harness hole 1323 for a wiring harness to pass through. Of course, the invention imposes no limitation on the specific configuration position, shape and size of the wiring harness hole 1323, and the technical personnel can configure same themselves according to actual usage requirements. When the accommodation support member 132 is mounted in place, an open end of the bowl-shaped structure is located on the side close to the body side outer panel 11, and the bottom thereof is located on the side close to the rear wheel cover outer panel 14. The second mounting opening 1321 is provided in the inner side of the accommodation support member 132, that is, the bottom of the bowl-shaped structure, and the technical personnel can configure the specific shape and size of the second mounting opening 1321 themselves according to actual usage requirements, as long as the charging socket assembly 122 can pass through the second mounting opening 1321. Also, the shape of a top edge of the accommodation support member 132, that is, the edge of the open end of the bowl-shaped structure, matches the shape of part of the inner side surface of the body side outer panel 11, such that the accommodation support member 132 can be better fitted and connected to the inner side surface of the body side outer panel 11. As a preferable configuration, the top edge of the accommodation support member 132 also extends outwards to form a flanging structure such that the accommodation support member 132 can be fitted and connected to the inner side surface of the body side outer panel 11 by means of the flanging structure in order to further improve the fitting tightness.

It should be noted that the invention imposes no limitation on the manufacturing methods and materials of the mounting bracket 131 and the accommodation support member 132, and the technical personnel can select same themselves according to actual usage requirements. As a preferred configuration, a plastic and hot-melt adhesive double injection-molding solution may be used for the accommodation support member 132 so as to better decrease the tolerance and achieve a better waterproof effect. Also, the mounting bracket 131 can be made of plastic and then fixedly connected in a threaded connection manner.

In addition, as a preferred connection method, the accommodation support member 132 and the body side outer panel 11 are fitted and connected by means of vibration isolation adhesive. Of course, the invention imposes no limitation on the specific type of the vibration isolation adhesive, and the technical personnel can select same themselves according to actual usage requirements, as long as a bonding effect can be achieved. It should also be noted that the method of connection by bonding with the vibration isolation adhesive is merely a preferred connection method, but is not restrictive, and the technical personnel can adjust same themselves according to actual usage requirements.

With continued reference to FIG. 5, as shown in FIG. 5, as a preferred configuration, the mounting bracket 131 comprises a square mounting plate 1311 and four mounting feet 1312 extending inwards along four corners of the mounting plate 1311, with the middle of the mounting plate 1311 being provided with a through hole 1313. Of course, the invention imposes no limitation on the specific shape of the mounting plate 1311 and the specific shapes and number of the mounting feet 1312, and the technical personnel can configure same themselves according to actual usage requirements. The mounting plate 1311 is provided with a plurality of mounting holes for bolts to pass through, and after the charging socket assembly 122 is pre-hung in place, an operator screws the bolts through the first mounting opening 111 so as to fix the mounting plate 1311 and the charging socket assembly 122 together. When the mounting plate 1311 and the charging socket assembly 122 are assembled in place, the through hole 1313 is aligned with the first mounting opening 111, and a charging port of the charging socket assembly 122 is exposed out of the through hole 1313. The technical personnel can configure the specific shape of the through hole 1313 according to the specific shape of the charging port of the charging socket assembly 122. It should be noted that the invention imposes no limitation on the specific connection method for the charging socket assembly 122 and the mounting bracket 131 and the specific connection method for the mounting bracket 131 and the accommodation support member 132, and the technical personnel can configure same themselves according to actual usage requirements. As a preferred connection method, the mounting feet 1312 are fixedly connected to the accommodation support member 132 by means of welding so as to effectively ensure the reliability and stability of connection.

With continued reference to FIG. 2, as shown in FIG. 2, as a preferable configuration, the inner side surface of the accommodation support member 132 is fixedly connected to the outer side surface of the rear wheel cover outer panel 14 by means of welding so as to effectively ensure the reliability of connection, and preferably by means of spot welding so as to effectively improve the assembly efficiency. When the accommodation support member 132 and the rear wheel cover outer panel 14 are connected in place, the third mounting opening 141 is aligned with the second mounting opening 1321 so that the charging socket assembly 122 and a wiring harness thereof can pass through. Of course, the invention imposes no limitation on the specific shape and size of the third mounting opening 141, as long as the charging socket assembly 122 can successively pass through the third mounting opening 141 and the second mounting opening 1321 and is then fixedly connected to the mounting bracket 131.

Further, the outer side surface of the rear wheel cover outer panel reinforcing plate 15 is fixedly connected to the inner side surface of the rear wheel cover outer panel 14 by means of welding so as to effectively ensure the reliability and stability of connection, and preferably by means of spot welding so as to effectively improve the assembly efficiency. When the rear wheel cover outer panel reinforcing plate 15 is assembled in place, the fourth mounting opening 151 is aligned with the third mounting opening 141 and the second mounting opening 1321 so that the charging socket assembly 122 and the wiring harness thereof can pass through smoothly. Of course, the invention imposes no limitation on the specific shape and size of the fourth mounting opening 151, as long as the charging socket assembly 122 can successively pass through the fourth mounting opening 151, the third mounting opening 141 and the second mounting opening 1321 and is then fixedly connected to the mounting bracket 131.

Still further, the vehicle charging port mounting assembly of the invention further comprises a D-pillar reinforcing plate 16. The D-pillar reinforcing plate 16 is fixedly connected to the rear wheel cover outer panel 14 and the rear wheel cover outer panel reinforcing plate 15, such that the rear wheel cover outer panel reinforcing plate 15 can be connected to the force transferring path of the vehicle body by means of the D-pillar reinforcing plate 16 so as to assist in improving the bending and torsion performance of the entire vehicle. The D-pillar reinforcing plate 16 is fixedly connected to the rear wheel cover outer panel 14 and the rear wheel cover outer panel reinforcing plate 15 preferably by means of welding so as to effectively secure the connection strength. It should be noted that the invention imposes no limitation on the specific structure and shape of the D-pillar reinforcing plate 16, and the technical personnel can configure same themselves according to actual usage requirements.

Furthermore, as a preferable connection method, the shape of part of edge of the body side outer panel 11 matches the shape of part of edge of the D-pillar reinforcing plate 16, so that the body side outer panel 11 and the D-pillar reinforcing plate 16 can be connected by means of edge covering and bonding. Also, the shape of part of edge of the body side outer panel 11 matches the shape of part of edge of the rear wheel cover outer panel 14, so that the body side outer panel 11 and the rear wheel cover outer panel 14 can also be connected by means of edge covering and bonding, which considers both the reliability of connection and the attractive appearance.

With continued reference to FIGS. 3 and 5, as shown in FIGS. 3 and 5, the accommodation support member 132 is provided with a first water discharge hole 1322, the first water discharge hole 1322 is preferably provided at the lowermost portion of the accommodation support member 132, and the rear wheel cover outer panel 14 is correspondingly provided with a second water discharge hole 142, and the first water discharge hole 1322 is connected to the second water discharge hole 142 by means of a water discharge pipe 17, such that water in the accommodation support member 132 can be discharged in time to the outside of the vehicle so as to effectively ensure that no water remains in the accommodation support member 132. It should be noted that the technical personnel can configure the specific shapes and arrangement positions of the first water discharge hole 1322 and the second water discharge hole 142 themselves according to actual usage requirements.

Furthermore, the invention further sets forth a vehicle including the vehicle charging port mounting assembly described in the preferred embodiments described above.

Heretofore, the technical solutions of the invention have been described with reference to the preferred embodiments shown in the drawings; however, those skilled in the art can readily understand that the scope of protection of the invention is obviously not merely limited to these specific embodiments. Those skilled in the art could make equivalent changes or substitutions to the related technical features without departing from the principles of the invention, and all the technical solutions after the changes or the substitutions fall within the scope of protection of the invention.

The invention claimed is:

1. A vehicle charging port mounting assembly, characterized by comprising a body side outer panel, a charging port component, a charging port mounting component, a rear wheel cover outer panel and a rear wheel cover outer panel reinforcing plate, wherein the rear wheel cover outer panel reinforcing plate is fixedly connected to an inner side of the rear wheel cover outer panel;

the charging port mounting component comprises a mounting bracket and an accommodation support member which is provided with an accommodation chamber, the mounting bracket being disposed in the accommodation chamber and fixedly connected to the accommodation support member, and the accommodation support member being disposed between the body side outer panel and the rear wheel cover outer panel;

the charging port component comprises a charging port cover assembly and a charging socket assembly, the charging port cover assembly being capable of covering the charging socket assembly;

the body side outer panel is provided with a first mounting opening, the charging port cover assembly is disposed in the first mounting opening, and the shape of the first mounting opening matches the shape of an outer side portion of the charging port cover assembly, such that the outer side portion of the charging port cover assembly is capable of covering the first mounting opening and thus covering the charging socket assembly; and the accommodation support member is provided with a second mounting opening, the rear wheel cover outer panel is provided with a third mounting opening, the rear wheel cover outer panel reinforcing plate is provided with a fourth mounting opening, and the charging socket assembly is capable of successively passing through the fourth mounting opening, the third mounting opening and the second mounting opening and is then fixedly connected to the mounting bracket.

2. The vehicle charging port mounting assembly according to claim 1, wherein that the shape of an outer side edge of the accommodation support member matches the shape of a part of an inner side surface of the body side outer panel such that the accommodation support member is fitted and connected to the inner side surface of the body side outer panel.

3. The vehicle charging port mounting assembly according to claim 2, wherein the accommodation support member is fitted and connected to the body side outer panel by means of vibration isolation adhesive.

4. The vehicle charging port mounting assembly according to claim 1, wherein the mounting bracket comprises a mounting plate and mounting feet extending inwards along the mounting plate, and the mounting plate is provided with a through hole; and the charging socket assembly is fixedly connected to the mounting plate, a charging port of the charging socket assembly is disposed at the through hole, and the mounting bracket is fixedly connected to the accommodation support member by means of the mounting feet.

5. The vehicle charging port mounting assembly according to claim 4, wherein the mounting feet are fixedly connected to the accommodation support member by means of welding.

6. The vehicle charging port mounting assembly according to claim 1, wherein the accommodation support member is fixedly connected to the rear wheel cover outer panel by means of welding, and the rear wheel cover outer panel is fixedly connected to the rear wheel cover outer panel reinforcing plate by means of welding.

7. The vehicle charging port mounting assembly according to claim 1, wherein the vehicle charging port mounting assembly further comprises a D-pillar reinforcing plate fixedly connected to the rear wheel cover outer panel reinforcing plate.

8. The vehicle charging port mounting assembly according to claim 7, wherein the shape of part of edge of the body side outer panel matches the shape of part of edge of the D-pillar reinforcing plate, such that the body side outer panel is connected to the D-pillar reinforcing plate by means of edge covering and bonding; and the shape of part of edge of the body side outer panel matches the shape of part of edge of the rear wheel cover outer panel, such that the body side outer panel is connected to the rear wheel cover outer panel by means of edge covering and bonding.

9. The vehicle charging port mounting assembly according to claim 1, wherein the accommodation support member is provided with a first water discharge hole, the rear wheel cover outer panel is correspondingly provided with a second water discharge hole, and the first water discharge hole is connected to the second water discharge hole by means of a water discharge pipe such that water in the accommodation support member is discharged to the outside of a vehicle.

10. A vehicle, characterized by comprising a vehicle charging port mounting assembly, wherein the vehicle charging port mounting assembly comprises a body side outer panel, a charging port component, a charging port mounting component, a rear wheel cover outer panel and a rear wheel cover outer panel reinforcing plate;

wherein the rear wheel cover outer panel reinforcing plate is fixedly connected to an inner side of the rear wheel cover outer panel;

wherein the charging port mounting component comprises a mounting bracket and an accommodation support member which is provided with an accommodation chamber, the mounting bracket being disposed in the accommodation chamber and fixedly connected to the accommodation support member, and the accommodation support member being disposed between the body side outer panel and the rear wheel cover outer panel;

wherein the charging port component comprises a charging port cover assembly and a charging socket assembly, the charging port cover assembly being capable of covering the charging socket assembly;

wherein the body side outer panel is provided with a first mounting opening, the charging port cover assembly is disposed in the first mounting opening, and the shape of the first mounting opening matches the shape of an outer side portion of the charging port cover assembly, such that the outer side portion of the charging port cover assembly is capable of covering the first mounting opening and thus covering the charging socket assembly; and wherein the accommodation support member is provided with a second mounting opening, the rear wheel cover outer panel is provided with a third mounting opening, the rear wheel cover outer panel reinforcing plate is provided with a fourth mounting opening, and the charging socket assembly is capable of successively passing through the fourth mounting opening, the third mounting opening and the second mounting opening and is then fixedly connected to the mounting bracket.

* * * * *